R. A. FESSENDEN.
SIGNALING BY ELECTROMAGNETIC WAVES.
APPLICATION FILED JUNE 21, 1906.

956,489.

Patented Apr. 26, 1910.

Witnesses
Philip Post
Jessie E. Bent

Inventor
Reginald A. Fessenden

PATENT OFFICE.

REGINALD A. FESSENDEN, OF WASHINGTON, DISTRICT OF COLUMBIA.

SIGNALING BY ELECTROMAGNETIC WAVES.

956,489. Specification of Letters Patent. Patented Apr. 26, 1910.

Application filed June 21, 1906. Serial No. 322,719.

*To all whom it may concern:*

Be it known that I, REGINALD A. FESSENDEN, citizen of the United States, and resident of Washington, in the District of Columbia, have invented certain new and useful Improvements in Signaling by Electromagnetic Waves, of which the following is a specification.

The invention described herein relates to certain improvements in the transmission and receipt of energy by electromagnetic waves and more especially the transmission to, and receipt from, a given direction of electromagnetic wave signals.

The invention is hereinafter more fully described and claimed.

Figure 1:
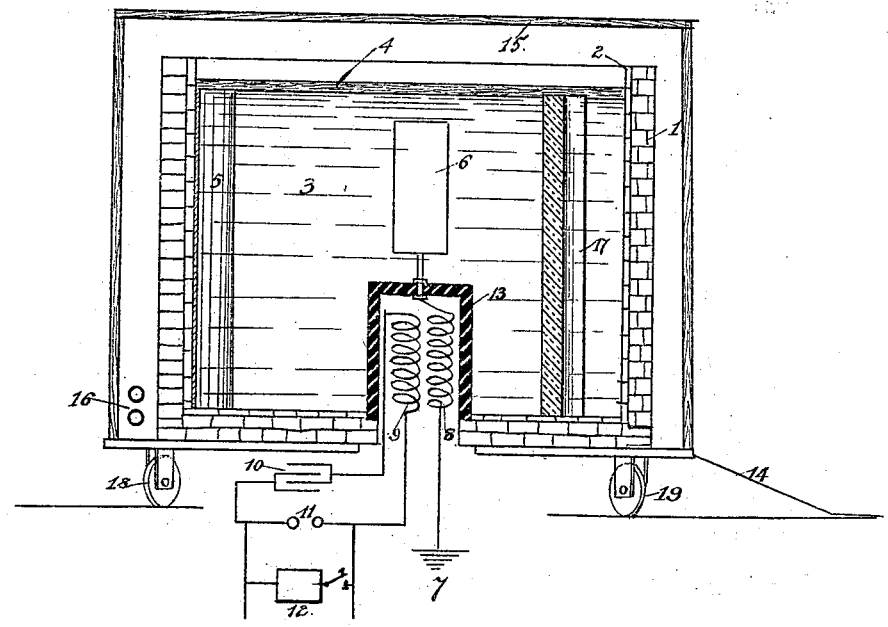
Figure 2:
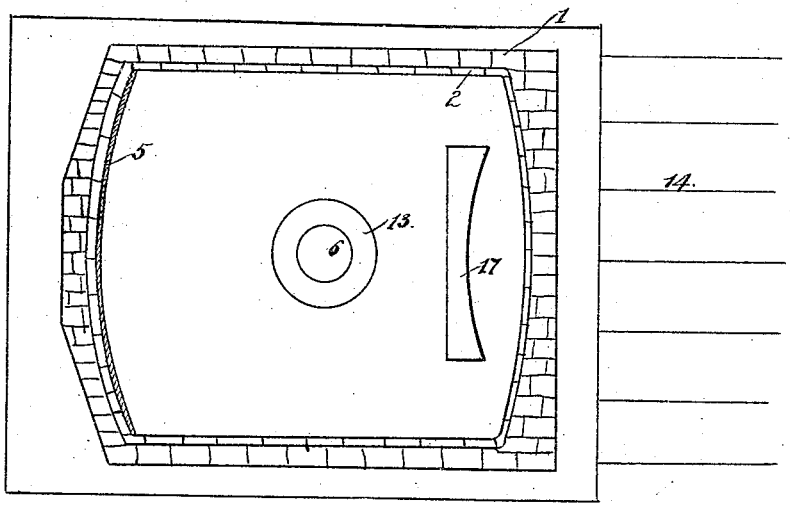

In the accompanying drawings forming a part of this specification Figures 1 and 2 are views illustrating a form of the invention.

I am aware that waves have been focused by means of reflectors placed behind the sending conductor, for example by Hertz, Lodge and Marconi. I am also aware that attempts have been made to focus such waves by means of systems of vertical conductors, for example by S. G. Brown, Slaby and others. These are not, however, operative for wireless telegraphy by reason of the fact that they either necessitate the use of extremely short wave lengths or else do not act efficiently as a projector, since, unless the linear dimensions of the projector are large as compared with the wave length emitted the reflector does not act as a projector but merely as a fresh source of radiation, according to Huyghen's law.

In the practice of my invention I construct a tank 1 having its walls and bottom preferably formed of brick soaked in asphaltum, asphaltum or asphaltum and sand being used as a mortar. The tank is preferably lined on the inside and bottom with a porcelain lining 2 for the purpose of preventing contamination of the fluid contained in the tank. The fluid 3 contained in the tank is a dielectric of high specific inductive capacity, preferably distilled water. The water is preferably coated with a layer of oil 4, to prevent evaporation. The whole tank is preferably inclosed in a house or box 15 preferably constructed of asbestos or well varnished wood. The bottom is preferably constructed of a conducting material such as metal or if the bottom is made of wood it, *i. e.* the bottom is preferably sheathed with sheet-tin or sheet-zinc. In order to maintain the temperature of the tank approximately constant, the pipes 16 are used, through which a hot or cold mixture is led according to the temperature of the outside air.

6 is a sending conductor which may be arranged to radiate electromagnetic energy in any suitable way, for example by having connected in series with it the secondary 8 of the Elihu Thompson air-core transformer grounded at 7.

13 is an insulator preferably of porcelain.

The secondary 8 is operatively connected to an oscillating circuit which may consist of the spark gap 11, condenser 10, and primary 9. The same coupling may be used for receiving as for sending and the receiver 12 connected as shown by closing its switch, when it is desired to receive.

5 is a reflector which may be made of wire netting or wires, or of an integral piece of metal as shown, preferably in parabolic form.

A wave chute 14 is preferably used in connection with the apparatus.

The farther wall of the tank may be given a lenticular form as shown and auxiliary lenses such as 17, may be used.

Where it is desired to change the direction of focusing the reflector 5 and auxiliary lens 17 may be arranged to rotate, or as shown in Fig. 1, the whole tank may be arranged to rotate by means of the wheels 18, 19.

By means of the construction here shown the linear dimensions of the reflector may be made large in comparison with the wave length, and hence efficient focusing may be obtained while at the same time employing waves of a suitable length for wireless telegraphy. For example if the reflector 5 be 90 ft. in diameter, the sending conductor 6 may be 6 inches in length and may be made to oscillate at such a frequency that the wave length in the medium 3 is only 3 ft. In this case the ratio between the diameter of the reflector and the wave length is 30 to 1, which gives a ratio which permits of throwing a fairly concentrated beam of rays. As the specific inductive capacity of the medium, distilled water, is approximately 80, the wave length outside the medium will be approximately 27 feet. To obtain the same ratio between the dimensions of the reflector and the wave length in air would require the reflector to be 810 ft. diameter from which the advantages of this construction will be apparent. In addition, since the specific inductive capacity of the dielectric is 80, the energy emitted by the sending conductor 6, although it is only 6 inches long will be the same in amount as that emitted by a sending conductor 40 ft. high in air. In addition, on account of the focusing the energy will be concentrated so that the amount received at the desired point will be more than one-hundred times greater than if the wave spread out in every direction instead of being focused. This construction therefore permits of the employment of relatively small amounts of energy to accomplish transmission over a given distance, and moreover when this construction is used for receiving, in addition to the focusing of the waves at the receiving station by the reflector, interference from other directions can be entirely kept out by extending the reflector 5 so as to nearly surround the sending conductor 6 except in the direction from which it is desired to receive the waves.

What I claim is:

1. In a system for the transmission and receipt of energy by electromagnetic waves, the combination of an antenna, a medium of high specific inductive capacity, and an insulating container for the antenna and medium.

2. In a system for the transmission and receipt of energy by electromagnetic waves, the combination of an antenna, an adjacent medium of high specific inductive capacity surrounding the antenna and a reflector therein arranged on one side of the antenna.

3. In a system for the transmission and receipt of energy by electromagnetic waves, the combination of an antenna, a surrounding medium of high specific inductive capacity, a reflector therein also arranged in operative relation to the antenna and a lenticular wall arranged on the side of the antenna opposite the reflector.

4. In a system for the transmission and receipt of energy by electromagnetic waves, the combination of an antenna, an adjacent medium of high specific inductive capacity, a reflector arranged therein on one side of the antenna and means for changing the position of the reflector in accordance with the direction in which communication is to be established.

5. In a system of transmission and receipt of energy by electromagnetic waves, the combination of an antenna, a medium of high specific inductive capacity, a reflector arranged in operative relation to the antenna and an insulating inclosure for said parts or elements.

6. In wireless telegraphy apparatus, the combination of a medium of high specific inductive capacity and an antenna and reflector immersed in said medium.

7. In wireless telegraphy apparatus a medium of high specific inductive capacity and an antenna and a lens immersed therein.

Signed at Brant Rock, in the county of Plymouth and State of Massachusetts this 19th day of June A. D. 1906.

REGINALD A. FESSENDEN.

Witnesses:
JESSIE E. BENT,
PHILIP T. POST.